United States Patent
Tran et al.

(10) Patent No.: US 9,589,041 B2
(45) Date of Patent: Mar. 7, 2017

(54) CLIENT AND SERVER INTEGRATION FOR REPLICATING DATA

(71) Applicant: Oracle International Corporation, Redwood Shores, CA (US)

(72) Inventors: Hung V. Tran, Sunnyvale, CA (US); Lik Wong, Palo Alto, CA (US); Nimar Singh Arora, Union City, CA (US); Thuvan Hoang, San Mateo, CA (US); Edwina Ming-Yue Lu, Palo Alto, CA (US); Tianshu Li, Mission Viejo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 13/951,281

(22) Filed: Jul. 25, 2013

(65) Prior Publication Data
US 2015/0032695 A1   Jan. 29, 2015

(51) Int. Cl.
*G06F 17/00*   (2006.01)
*G06F 17/30*   (2006.01)

(52) U.S. Cl.
CPC ........ *G06F 17/30578* (2013.01); *G06F 17/00* (2013.01)

(58) Field of Classification Search
CPC ......... G06F 17/30578; G06F 17/30575; G06F 17/30371; G06F 17/30312; G06F 11/2064
USPC ..... 707/999.2, 640, 648, 643, E17.032, 625, 707/609
See application file for complete search history.

(56) References Cited

U.S. PATENT DOCUMENTS

| | | | |
|---|---|---|---|
| 5,870,761 | A | 2/1999 | Demers et al. |
| 6,199,171 | B1 | 3/2001 | Bossen |
| 6,976,022 | B2 | 12/2005 | Vemuri |
| 7,529,759 | B2 | 5/2009 | Chen |
| 7,570,451 | B2 | 8/2009 | Bedillion et al. |

(Continued)

OTHER PUBLICATIONS

"Making Batch Updates in JDBC Applications", http://publib.boulder.ibm.com/infocenter/db2luw/v8/topic/com.ibm.db2.u., Jan. 6, 2011, 2 pages.

(Continued)

*Primary Examiner* — Robert Beausoliel, Jr.
*Assistant Examiner* — Pedro J Santos
(74) *Attorney, Agent, or Firm* — Hickman Palermo Becker Bingham LLP; Marcel K. Bingham

(57) ABSTRACT

Techniques are provided for client and server integration for scalable replication. A replication client transmits change records to a database server over a stream. The database server determines at least one batch comprising change records for at least one transaction. The database server generates dependency data for at least one change record in a batch based on at least one constraint identifier for at least one column. The database server determines an ordered grouping of the change records based on an operation type of each change record and the dependency data of each change record, wherein change records sharing operation types are grouped together unless a division based on the dependency data is determined. The database server generates a reordered transaction comprising a plurality of reordered operations based on the ordered grouping of the change records of the particular batch.

22 Claims, 7 Drawing Sheets

(56) References Cited

U.S. PATENT DOCUMENTS

| | | | |
|---|---|---|---|
| 7,912,051 | B1 | 3/2011 | Rowlands et al. |
| 8,473,953 | B2 | 6/2013 | Bourbonnais |
| 8,589,346 | B2 | 11/2013 | Lu et al. |
| 9,063,773 | B2 | 6/2015 | Lu |
| 2002/0133507 | A1* | 9/2002 | Holenstein .......... G06F 11/2064 |
| 2002/0198899 | A1* | 12/2002 | Yamaguchi et al. .......... 707/200 |
| 2004/0068501 | A1 | 4/2004 | McGoveran |
| 2004/0199552 | A1 | 10/2004 | Ward et al. |
| 2005/0289198 | A1 | 12/2005 | Todd |
| 2006/0010130 | A1 | 1/2006 | Leff et al. |
| 2007/0288530 | A1* | 12/2007 | Romem et al. ............... 707/202 |
| 2008/0052322 | A1* | 2/2008 | Gusciora ........... G06F 17/30575 |
| 2008/0098044 | A1 | 4/2008 | Todd |
| 2009/0037461 | A1 | 2/2009 | Rukonic |
| 2010/0250491 | A1* | 9/2010 | Jin et al. ....................... 707/634 |
| 2011/0173619 | A1* | 7/2011 | Fish .............................. 718/101 |
| 2012/0023369 | A1 | 1/2012 | Bourbonnais et al. |
| 2012/0278282 | A1* | 11/2012 | Lu et al. ........................ 707/634 |
| 2012/0284228 | A1 | 11/2012 | Ghosh et al. |
| 2013/0226870 | A1* | 8/2013 | Dash .................... G06F 3/0619 707/634 |
| 2015/0269215 | A1 | 9/2015 | Lehouillier et al. |

OTHER PUBLICATIONS

Oracle, "MySQL 5.5 Reference Manual" Chapter 17, Replication, http://dev.mysql.com/doc/refman/5.5/en/replication.html, Jan. 6, 2011, 2 pages.

Oracle Database, "Advanced Replication", Chapter 2: Master Replication Concepts and Architecture, Dec. 2003, 66 pages.

Oracle Database, "Advanced Replication Management API", Chapter 7: Managing a Master Replication Environment, Dec. 2003, 72 pages.

Oracle Data Guard, "Concepts and Administration", Chapter 9: Managing a Logical Standby Database, Dec. 2003, 43 pages.

U.S. Appl. No. 13/094,676, filed Apr. 26, 2011, Office Action, Mar. 13, 2013.

U.S. Appl. No. 13/094,676, filed Apr. 26, 2011, Notice of Allowance, Jul. 12, 2013.

U.S. Appl. No. 14/222,373, filed Mar. 21, 2014, Interview Summary, Feb. 25, 2016.

U.S. Appl. No. 14/222,373, filed Mar. 21, 2014, Office Action, Dec. 1, 2015.

U.S. Appl. No. 14/222,373, filed Mar. 21, 2014, Final Office Action, May 3, 2016.

\* cited by examiner

|     | TABLE X 302 | |
|-----|-------------|-------------|
| 314 | X_PRIMARY 304 | X_VALUE 306 |

*CONSTRAINT ID=A*

|     | TABLE Y 308 | |
|-----|-------------|-------------|
| 316 | Y_PRIMARY 310 | X_FOREIGN 312 |

*CONSTRAINT ID=B   CONSTRAINT ID=A*
                                                                    —318

*FIG. 3A*

R1: INSERT TABLE_X (1,1)          320
R2: INSERT TABLE_X (2,1)
R3: INSERT TABLE_Y (1,1)
R4: INSERT TABLE_X (3,1)
R5: INSERT TABLE_Y (2,1)
R6: INSERT TABLE_X (4,1)
R7: UPDATE TABLE_X:
    X_VALUE=2 WHERE X_PRIMARY=1
R8: UPDATE TABLE_X:
    X_PRIMARY=10 WHERE X_PRIMARY=3
R9: INSERT TABLE_X (3,10)
R10: INSERT TABLE_X (5,1)
R11: INSERT TABLE_Y (3,1)
R12: INSERT TABLE_Y (4,3)

GROUP 1 [INSERT X]: R1, R2, R4, R6, R10          324
GROUP 2 [INSERT Y]: R3, R5, R11
GROUP 3 [UPDATE X: X_VALUE]: R7
GROUP 4 [UPDATE X: X_PRIMARY]: R8
GROUP 5 [INSERT X]: R9
GROUP 6 [INSERT Y]: R12

*FIG. 3D*

| REORDERED BATCH 326: [R1, R2, R4, R6, R10], [R3, R5, R11], R7, R8, R9, R12 |
|---|

*FIG. 3E*

CLIENT AND SERVER INTEGRATION FOR REPLICATING DATA

TECHNICAL FIELD

The present disclosure generally relates to data management, and, more specifically, to data replication.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers systems may be configured to store and retrieve large amounts of data. Typically, the computer systems rely on database systems to perform this function. Replication is the process of replicating data from a source database onto another database system, herein referred to as a target database.

One approach to replication is the physical replication approach. Under the physical replication approach, the changes made to data blocks on the source database are made to replicas of those data blocks on a target database. Because the source database is replicated at the lowest atomic level of storage space on the target database, the target database is a physical replica of the source database.

Another approach to replicating data is the logical replication approach. Under the logical replication approach, database commands that modify data on the source database are re-executed on the target database. While executing the same database commands guarantees that changes are replicated at the record level, the changes are not replicated at the data block level.

Typically, changes to database systems are made using transaction processing. A transaction is a set of operations that change data. In database systems, the operations are specified by one or more database commands. Committing a transaction refers to making the changes for a transaction permanent. Under transaction processing, all the changes for a transaction are made atomically. When a transaction is committed, either all changes are committed, or the transaction is rolled back.

A replication client may be configured to execute transaction processing. The replication client obtains transaction data for transactions executed on a source database and applies the transactions to the target database. Typically, the replication client interacts with the target database by submitting database commands to the database server over a synchronous connection with the database server. For example, a replication client may construct and issue SQL queries to the database system to make changes to the data.

Based on the foregoing, it is desirable to develop an approach that allows client and server integration for replicating data.

SUMMARY OF THE INVENTION

Techniques are provided for client and server integration for replicating data on computer systems, including database systems. The claims are hereby incorporated into this summary.

BRIEF DESCRIPTION OF THE DRAWINGS

In the drawings:

FIGS. 3A-E illustrate an example of reordering a batch of operations;

DESCRIPTION OF EXAMPLE EMBODIMENTS

Figure 1A:
FIGS. 1A-B are block diagrams depicting an embodiment of a system for client and server integration for replicating data between a target database and a source database.

Client and server integration for replicating data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. General Overview

Client and server integration for replicating data is described. A replication client and a target database server are integrated to asynchronously replicate supported transactions and to synchronize to replicated other transactions. To asynchronously replicate transactions, the replication client transmits change records to a database server over an asynchronous stream of change records. These change records are directly processed and applied by the database server rather than via database commands issued by the replication client. The replication client and the target database server may be integrated to synchronously replicate transactions that are not supported in asynchronous mode. A transaction may be unsupported due to an unsupported database type, a schema change, error handling, or other reasons.

The replication client and the target database server may further be integrated such that one or more events are handled. The one or more events may be handled asynchronously or synchronously. Synchronous events may be handled after a synchronization procedure between the replication client and the target database server.

To asynchronously replicate transactions, a replication client receives a plurality of change records for a plurality of transactions performed on a source database. The replication client transmits the plurality of change records to a database server over an asynchronous stream of change records. As used herein, the term "asynchronous stream" refers to a stream over which data is sent from a sender to a recipient without acknowledgement to the recipient from the sender. The target database server generates dependency data for at least one change record in a batch of one or more transactions. Dependency data may be generated based on at least one constraint identifier for at least one column. For a particular batch of one or more transactions, the database server further determines an ordered grouping of the change records based on an operation type of each change record and the dependency data. Change records sharing operation types, on the same object and column/s, are grouped together unless a division based on the dependency data is determined. The database server generates a reordered transaction based on the ordered grouping and executes the reordered transaction. The reordered transaction may be executed using array execution of one or more array operations. Array operations improve database performance by combining similar operations for more efficient execution.

To synchronously replicate one or more transactions, the replication client detects an unsupported change record associated with a current transaction. After detecting the unsupported change record, the replication client pauses transmission over the asynchronous stream, transmits a synchronization command over the asynchronous stream to the database server. After the database server notifies the replication client that it has reached a synchronized state, the replication client causes execution of the current transaction by submitting at least one database command to the database server. The replication client resumes transmission of the plurality of change records over the asynchronous stream after completion of the database command.

2. Database Management Systems

Embodiments described herein may be used in the context of database management systems (DBMSs). A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Performing operations within a database server often entails invoking multiple layers software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. Typically, a client accesses a database server through an interface, such as an SQL interface to the SQL layer. The SQL layer analyzes and parses and executes the statement. During execution of the statement, the SQL layer calls modules of a lower layer to retrieve a particular row from a table and to update a particular in a table. A client, such as a replication client, typically accesses the database via a database command to the database server, such as in the form of a SQL statement.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

3. System Overview

Figure 1B:

FIGS. 1A-B are block diagrams depicting an embodiment of a system for client and server integration for replicating data between a target database and a source database. FIG. 1A is a block diagram depicting an embodiment of a system configured to generate replication data comprising transactions performed on a source database. Source database server 102 is configured to maintain a source database. In one embodiment, source database server 102 is configured to log database changes made to the source database.

Extraction client 104 is configured to extract replication data 106. Replication data 106 contains sufficient information to determine what actions were performed on the source database, including the record(s) affected by an operation and the order in which the source transactions were committed. For example, extraction client 104 may process logged database changes made to the source database to extract logical replication data 106. In one embodiment, extraction client 104 does not have direct access to the source database. However, extraction client 104 may be a module of source database server 102 and/or may share one or more computing resources with source database server 102. Alternatively and/or in addition, extraction client 104 may communicate with source database server 102 over a network.

Replication data 106 contains change records that describe operations and/or transactions performed on the source database by source database server 102. A change record may include data showing the difference between an existing record and the new record. For example, the change records may be logical change records (LCRs) that represent source database Data Manipulation Language (DML) transactions or Data Definition Language (DDL) transactions. In one embodiment, the LCRs are flattened or otherwise formatted to facilitate storage and/or transmission. A flattened LCR is a stored representation of an LCR object that contains sufficient data to reconstruct the LCR object at a later stage.

In one embodiment, replication data 106 includes all transactions performed on the source database in committed order. Replication data 106 may alternatively include a subset of transactions performed on the source database. Extraction client 104 may be configured to capture operations and/or transactions performed on the source database. For example, extraction client 104 may generate a log, structure, and/or file containing database operations. Replication data may include one or more files or other data, which may be generated specifically for the purpose of replication, or alternatively generated as an audit or record file. In one embodiment, replication data 106 resides on source database server 102 outside of the source database. Alternatively and/or in addition, extraction client 104 may transmit replication data 106 over a network. For example, extraction client 104 may write replication data 106 to a network location. Alternatively and/or in addition, extraction client 104 may generate a replication data stream containing replication data 106.

FIG. 1B is a block diagram depicting an embodiment of a system for performing replication on a target database. Target database server 110 is configured to maintain a target database.

Replication client 108 and target database server 110 are integrated to facilitate replication on the target database. Replication client 108 does not have direct access to the source database. However, replication client 108 may be a module of target database server 110 and/or may share one or more computing resources with target database server 110. Alternatively and/or in addition, replication client 108 may communicate with target database server 110 over a network.

Replication client 108 is configured to read change records contained in replication data 106. Replication client 108 is further configured to transmit at least one change record to the target database server 110 in an asynchronous stream. In one embodiment, the change records include LCRs that represent DML transactions and/or DDL transactions. In one embodiment, the LCRs are flattened or otherwise formatted to facilitate storage and/or transmission.

The change records may be read from a file containing database operations, a network location, or over a data stream. In one embodiment, the change records include all transactions performed on the source database in committed order. For example replication client 108 may read replication data 106 from a network location. Alternatively and/or in addition, replication client 108 may receive change records from a replication data stream containing replication data 106. In one embodiment, replication client 108 does not create an intermediate object or otherwise format the change record before transmitting the change record to the target database server 110.

In one embodiment, replication client 108 and target database server 110 are integrated to bypass a public interface and the associated layer of target database server 110 (e.g. the SQL interface and the SQL layer) by asynchronously streaming change records to the database server. The database server reconfigures and executes batches of one or more transactions directly at the lower layer. Replication client 108 may still interact with target database server 110 through the SQL layer for certain types of transactions, error handling, and other events.

4. Parallel Apply and Batching

A replication client is configured to asynchronously transmit change records to a target database server. The target database server applies one or more transactions, which may be reordered by the target database server. The target database server may also combine one or more transactions into a batch, where reordering is performed over all operations within a batch.

Figure 2:
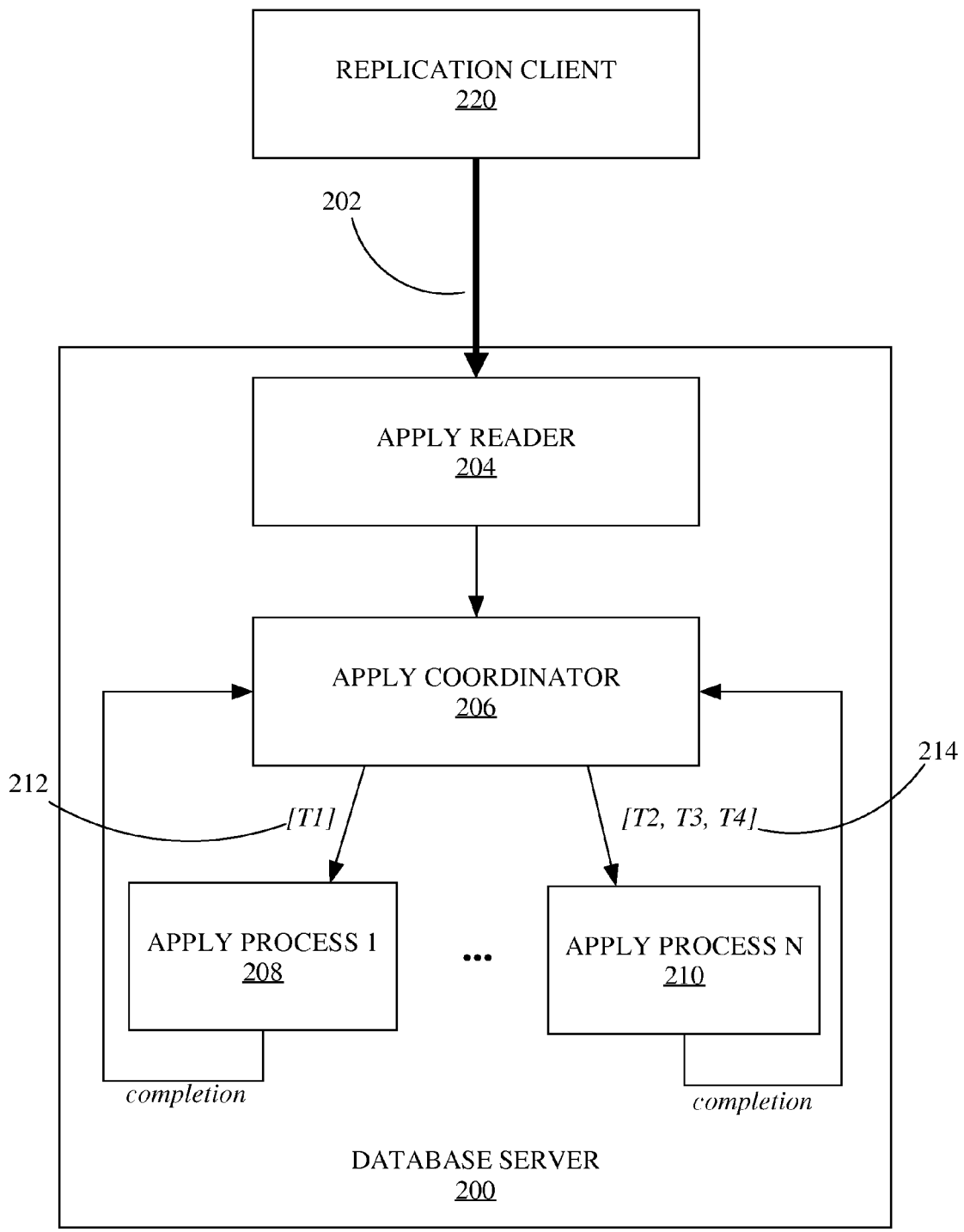
FIG. 2 is a block diagram depicting data flow in an embodiment of a database server configured to apply batches of transactions in parallel.

The target database server may be configured to apply and/or batch one or more transactions in parallel. FIG. 2 is a block diagram depicting data flow in an embodiment of a database server configured to apply batches of transactions in parallel. Database server 200 is configured to maintain a target database. Replication client 220 and database server 200 are integrated to facilitate replication on the target database.

Database server 200 includes apply reader 204. Apply reader 204 is configured to receive data stream 202 from replication client 220. Data stream 202 includes a plurality of change records for a plurality of transactions performed on a source database. For example, the plurality of change records may represent DML transactions and/or DDL transactions. In one embodiment, the change records are LCRs, which may be flattened or otherwise formatted to facilitate storage and/or transmission. In one embodiment, replication client 220 does not create an intermediate object or otherwise format the change record before transmitting the change record over data stream 202. Apply reader 204 may also be configured to perform dependency computations usable to determine which transactions are dependent on each other to facilitate parallel scheduling.

In one embodiment, data stream 202 is an asynchronous stream. Replication client 220 may be configured to transmit change records to apply reader 204 in an asynchronous manner. In one embodiment, replication client 220 transmits change records as they are received by the replication client 220. Change records may be received by the replication client 220 by reading the change records from stored replication data, such as a log file, a remote file accessed over a network location, and/or other stored replication data. Change records may also be received by replication client 220 from a data stream associated with a source database server.

In the present example, the notation $CR(T_i, j)$ refers to a change record corresponding to operation j of transaction $T_i$, where $X_i$ denotes the number of operations in transaction $T_i$. In one embodiment, data stream 202 includes all transactions performed on the source database in committed order. Each transaction may terminate with a commit command (e.g. $CR(T_i, X_i)$ for transaction $T_i$).

Database server 200 further includes apply coordinator 206. Apply coordinator 206 is configured to schedule the processing of transactions by a set of apply processes 208-210. Apply coordinator 206 may perform dependency computation to determine which transactions are dependent on each other to facilitate parallel scheduling. Alternatively an/or in addition, apply coordinator 206 may use dependency information computed by another component, such as apply reader 204. In one embodiment, the number of apply processes 208-210 may be chosen, specified, changed, or otherwise manipulated. The number of apply processes 208-210 may be set to 1, causing serial transaction processing by one apply process.

In one embodiment, apply coordinator 206 is configured to determine at least one batch 212-214 comprising change records for at least one transaction received by apply reader 204 over data stream 202. For small transactions, batching can help improve performance by minimizing commit, applied progress table, and other communication costs. Batching may also increase the efficiency of transaction reordering by enabling execution of array operations across multiple transactions. Array operations are typically faster than individual executions and reduce overhead, such as redo data generated. As used herein, the term "array operation" refers to two or more operations grouped together for execution by a database server. The two or more operations may involve the same operation type on the same table/s and/or columns. For example, an array operation may be executed by an apply process 208-210 of database server 200. In one embodiment, a batch of multiple transactions may be treated as if it were one combined transaction containing all the changes from the transactions that make up the batch.

Apply coordinator 206 assigns batches 212-214 to one or more apply processes 208-210. Each batch 212-214 includes change records corresponding to at least one transaction $T_i$ received by apply reader 204. In one embodiment, batch 212-214 may include either a single transaction (e.g. batch 212) or multiple transactions (e.g. batch 214). In one embodiment, transactions in the same batch are consecutive (e.g. $T_i, T_{i+1}, \ldots T_{i+k}$). Alternatively or in addition, transactions in the same batch may include non-consecutive transactions.

In one embodiment, apply coordinator 206 is configured to determine at least one batch based on transaction size. For example, when apply coordinator 260 detects an idle apply process 208-210, apply coordinator 206 may assign transactions, beginning from the first unassigned complete transaction, until a certain threshold is reached, such as the number of accumulated change records. Other thresholds and/or conditions may limit the number of transactions included in a batch. For example, the number of transactions and/or change records in a batch may be limited to a maximum value. In one embodiment, certain transaction types involving an automatic commit are individually assigned to their own batch. For example, a transaction corresponding to a DDL change record may be assigned to its own batch, such as to address dependency issues.

Each apply process 208-210 is configured to process a batch 212-214 assigned by apply coordinator 206. To process a batch, apply processes 208-210 execute the changes contained in the change records on the target database. Apply processes 208-210 may reorder one or more change records in the batch to generate and execute a reordered transaction. When apply processes 208-210 have finished processing an assigned batch 212-214, apply processes 208-210 notify apply coordinator 206 that processing is complete for the transactions included in the batch.

5. Inter-Transaction and Intra-Transaction Dependencies

Database server 200 is configured to compute inter-transaction dependencies. As used herein, the term "inter-transaction dependency" refers to a dependency of a transaction on one or more other transactions. Furthermore, when a batch includes multiple transactions, the term "inter-transaction dependency" may refer to a dependency of any transaction within the batch to one or more other transactions not in the batch. To satisfy a dependency, the one or more other transactions must be committed before the dependent transaction is executed. In one embodiment, apply reader 204 computes dependencies between transactions and/or change records received in data stream 202 to facilitate database server operations downstream.

For example, apply processes 208-210 may use the computed dependencies to determine whether an apply process may execute an assigned batch of one or more transactions. In one embodiment, a batch containing multiple individual transactions is committed after execution of the reordered transaction. In this case, the effect of the individual transactions will not be visible to other transactions until the entire batch is committed. Therefore, an inter-transaction dependency on a transaction in another batch will not be satisfied until the other batch is committed.

In one embodiment, inter-transaction dependencies are calculated by generating one or more hash values for individual change records. The one or more hash values may be generated as the change records are received in data stream 202.

In one embodiment, database server 200 maintains a progress table to keep track of applied transactions. In one embodiment, the progress table includes transactions occurring after a low-watermark, i.e. a threshold up to which all transactions have been applied. For example, apply processes 208-210 may update the progress table after applying an assigned batch containing one or more transactions. Alternatively or in addition, apply processes 208-210 may use one or more redo markers containing data for one row of the progress table. In this case, apply processes 208-210 may insert the redo marker into the redo stream after applying any transaction rather than updating the progress table.

In one embodiment, dependency data generated to compute inter-transaction dependencies is preserved for use by apply processes 208-210 to compute intra-transaction dependencies. For example, apply processes 208-210 may use the data to compute inter-transaction dependencies to reorder change records within a batch of one or more transactions. As used herein, the term "intra-transaction dependency" refers to a dependency of a change record on one or more other change records within a batch of one or more transactions. For example, when a batch includes multiple transactions, an intra-transaction dependency may refer to a dependency of a change record in any of the multiple transactions on another change record within the multiple transactions. In one embodiment, dependency data is evaluated to avoid creating an intra-transaction dependency when operations within a batch are reordered. To satisfy a dependency, one or more operations associated with the one or more other change records must be executed before the dependent change record is executed. In one embodiment, apply processes 208-210 are configured to generate a reordered transaction for a batch such that dependencies on a transaction within the same batch are automatically satisfied.

6. Reordering

The database server is configured to generate a reordered transaction. The reordered transaction includes a plurality of reordered operations based on the order grouping of the change records in a batch of one or more transactions. In one embodiment, a batch of one or more transactions is assigned to an apply process configured to generate and execute the reordered transaction.

A batch includes a plurality of change records corresponding to operations in one or more transactions. Traditionally, a replication client executes one or more transactions by submitting at least one database command to the database server. In this case, the replication client interacts with the database server as a standard client application. In the integrated replication client and database server configuration described herein, a plurality of change records are provided to the database server over an asynchronous stream. The database server asynchronously executes a reordered transaction generated based on the change records. The database server may reorder the change records and/or the corresponding operations to improve performance. For example, reordering may be performed to maximize the use of array operations when executing the reordered transaction. Array operations improve database performance by combining operations involving changes to the same table and same columns.

FIGS. 3A-E illustrate an example of reordering a batch of one or more transactions. In one embodiment, reordering of a batch of one or more transactions is performed by one or more apply processes in parallel. Although structures relating to relational databases are shown, the reordering steps may be applied to any database.

FIG. 3A illustrates an embodiment of tables in a relational database. TABLE_X 302 and TABLE_Y 308 are tables in a relational database. TABLE_X 302 includes two columns: X_PRIMARY 304 and column "VALUE" 306. X_PRIMARY 304 is a primary key column for TABLE_X 302. A value in X_PRIMARY 304 uniquely identifies a row of TABLE_X 302.

TABLE_Y 308 includes two columns: Y_PRIMARY 310 and X_FOREIGN 312. Y_PRIMARY 310 is a primary key column for TABLE_Y 308. A value in Y_PRIMARY 310 uniquely identifies a row of TABLE_Y 308. X_FOREIGN 312 is a foreign key column. A value in X_FOREIGN 312 identifies a row of TABLE_X 302 by the primary key value in X_PRIMARY 304 of TABLE_X 302.

Constraint identifiers 314-318 are assigned to a plurality of columns in the relational database. In one embodiment, constraint identifiers 314-318 are assigned to columns with constraints that can affect inter-transaction and intra-transaction dependencies, such as columns containing primary keys, foreign keys, and unique indexes. Constraint identifiers 314-318 may also include one or more user-expressed constraints and/or application constraints, including but not limited to virtual constraints and rely constraints. Constraint identifiers 314-318 may be generated based on a schema of a database or other metadata associated with the database.

In one embodiment, constraint identifiers are assigned the same value to reflect a dependency. For example, constraint identifier 318 of column X_FOREIGN 312 is assigned the same value, "A", as constraint identifier 314 of column X_PRIMARY 304.

Dependency data is generated for one or more change records corresponding to an operation, such as an operation that inserts (adds), deletes, or updates (or otherwise modifies) a row (or data). The change record contains old values for columns for a delete, new values for an insert, and both old values and new values for updates (or the case where existing data is modified). For updates, the change record may contain an old value, but not a new value for a column, if that column has not been modified. The dependency data is generated based on the column values in the change record for the columns in the constraint. For updates, the dependency data can be generated for both the old and new values (if no old value is available in the change record for a constraint column, then the old value for the column can be used). In one embodiment, the dependency data for each change record includes at least one hash value. Each hash value is generated by hashing a column value, such as the values described above, with a constraint identifier 314-318 associated with the column.

FIG. 3B illustrates an embodiment of a batch 320 of one or more transactions. Batch 320 includes operations R1-R12. Operations R1-R12 may come from a single transaction or multiple transactions grouped into batch 320. During the reordering process, operations R1-R12 may be stored as change records in the format received by the database server and/or any other format that stores the equivalent information for operations R1-R12. The change records and/or operations may be converted from one format to another to facilitate database server operations. To the extent that the terms operation and change record refers to the same underlying data, the terms may be used interchangeably.

FIG. 3C illustrates an embodiment of dependency data generated based on at least one value change and at least one constraint identifier associated with one or more columns in each of operations R1-R12. Dependency data 320 is generated for an operation based on at least one column value in at least one column associated with a constraint identifier. In one embodiment, dependency data 320 is generated for operations R1-R12 by applying a function FN to a value change in an column and a constraint identifier associated with the column. In one embodiment, function FN is a hash function, and the dependency data includes hash values associated with one or more operations.

For example, operation R5 inserts a row (2, 1) into TABLE_Y, where the value 2 is inserted into column Y_PRIMARY 310 and the value 1 is inserted into column X_FOREIGN. The corresponding dependency data 320 for operation R5 includes a first dependency value FN(2,B) and a second dependency value FN(1,A). For the first dependency value, function FN is applied to the value "2" inserted into column Y_PRIMARY 310, and the constraint identifier value "B" associated with column Y_PRIMARY 310. For the second dependency value, function FN is applied to the value "1" inserted into column X_FOREIGN 312, and the constraint identifier value "A" associated with column X_FOREIGN 312.

In one embodiment, dependency data 320 is previously generated by the database server while computing inter-transaction dependencies. The previously generated dependency data 320 is preserved for use to compute intra-transaction dependencies for reordering a batch of one or more transactions as well as inter-batch transactions. For example, data generated by the apply reader to compute inter-transaction dependencies may be preserved for use by apply processes 208-210.

In one embodiment, data generated to compute inter-transaction dependencies is preserved for use to compute intra-transaction dependencies. For example, after apply coordinator 206 and/or apply reader 204 computes and/or uses inter-transaction dependencies to determine at least one batch, apply processes 208-210 may use the data to compute intra-transaction dependencies to reorder change records within a batch of one or more transactions.

FIG. 3D illustrates an embodiment of an ordered grouping of operations. Operations R1-R12 are grouped into a plurality of ordered groups 324. Operations R1-R12 are grouped based on an operation type of each change record. For example, operations may be grouped by matching at least a portion of a change record, wherein a portion of the change record indicates operation type.

In one embodiment, operation types include the column set affected by the operation. For example, GROUP 3 includes UPDATE operations performed on a column set containing X_VALUE 306, while GROUP 4 includes UPDATE operations performed on a column set containing X_PRIMARY 304. A specific operation type used for grouping may involve the same operation on the same column set of the same table.

In one embodiment, operations sharing an operation type are grouped together unless a division based on the dependency data is determined. In one embodiment, a division based on dependency data is determined when one or more operations sharing an operation type also share dependency data values. In one embodiment, a division is determined when at least one hash value is shared by operations within a group. A shared dependency data value may indicate a potential dependency.

For example, operations R1, R2, R4, R6, R9 and R10 share the same operation type INSERT into TABLE X 302. Because a division based on dependency data 322 is determined, these operations are separated into two groups:

GROUP 1 and GROUP 5. For example, as shown in dependency data 322, operations R4 and R9 share the dependency data value FN(3,A).

The order of ordered grouping 324 may be based at least in part on an original operation order in the batch of one or more transactions. In one embodiment, the dependency data may further be used to determine an order of the groups. For example, as shown in dependency data 322, operation R8 shares dependency data value FN(3,A) with operation R9, indicating a dependency. To address this dependency, operation R9 is placed in GROUP 5, a group that occurs after GROUP 4, which contains R8.

A shared dependency data value may indicate a potential dependency. Additional processing may determine whether the potential dependency is associated with an intra-transaction dependency that must be satisfied to execute the batch one or more transactions. In one embodiment, additional logic is used to determine whether a division is appropriate when a dependency data value is shared. One or more rules for division based on dependency values may be implemented to detect and handle intra-transaction dependencies.

As a non-limiting example, operations R3, R5 and R11 of batch 320 shared dependency data value $FN(1,A)^{FK}$, wherein "$FK$" indicates that the dependency value is generated based on a foreign key constraint associated a primary key column X_PRIMARY 304 of TABLE_X 302. By tracking the source of the dependency value with the information "$FK$", it is determined that operations R3, R5 and R11 may be placed in the same group without violating any intra-transaction dependency because INSERT operations into TABLE_Y 308 do not depend on each other.

FIG. 3E illustrates an embodiment of a reordered batch of operations. Reordered batch 326 includes a plurality of reordered operations from batch 320. The operations are ordered based on the ordered grouping 324. In one embodiment, grouping is configured to maximize the number of operations and/or change records in a group. When reordered batch 326 is executed by the database server, the database server may use array operations on consecutive operations within reordered batch 326. Although FIG. 3E illustrates a separate reordered batch 326 from the ordered grouping 324, the order grouping 324 may be considered a reordered transaction when executed by the database server, even if a separate transaction structure is not generated.

7. Replication Client Integrated Processes

A replication client configured in accordance with client and server integration for replicating data may be configured to: (a) transmit change records asynchronously to the target database server to bypass the public interface of the database server, and (b) execute one or more transactions via a public interface of the target database server. The replication client may be configured to execute one or more transactions via the public interface of the target database server when a change record is directed to an unsupported database type, when a change record is directed to a schema change, to address an error encountered by the target database server, or under any other appropriate circumstance.

Figure 4:
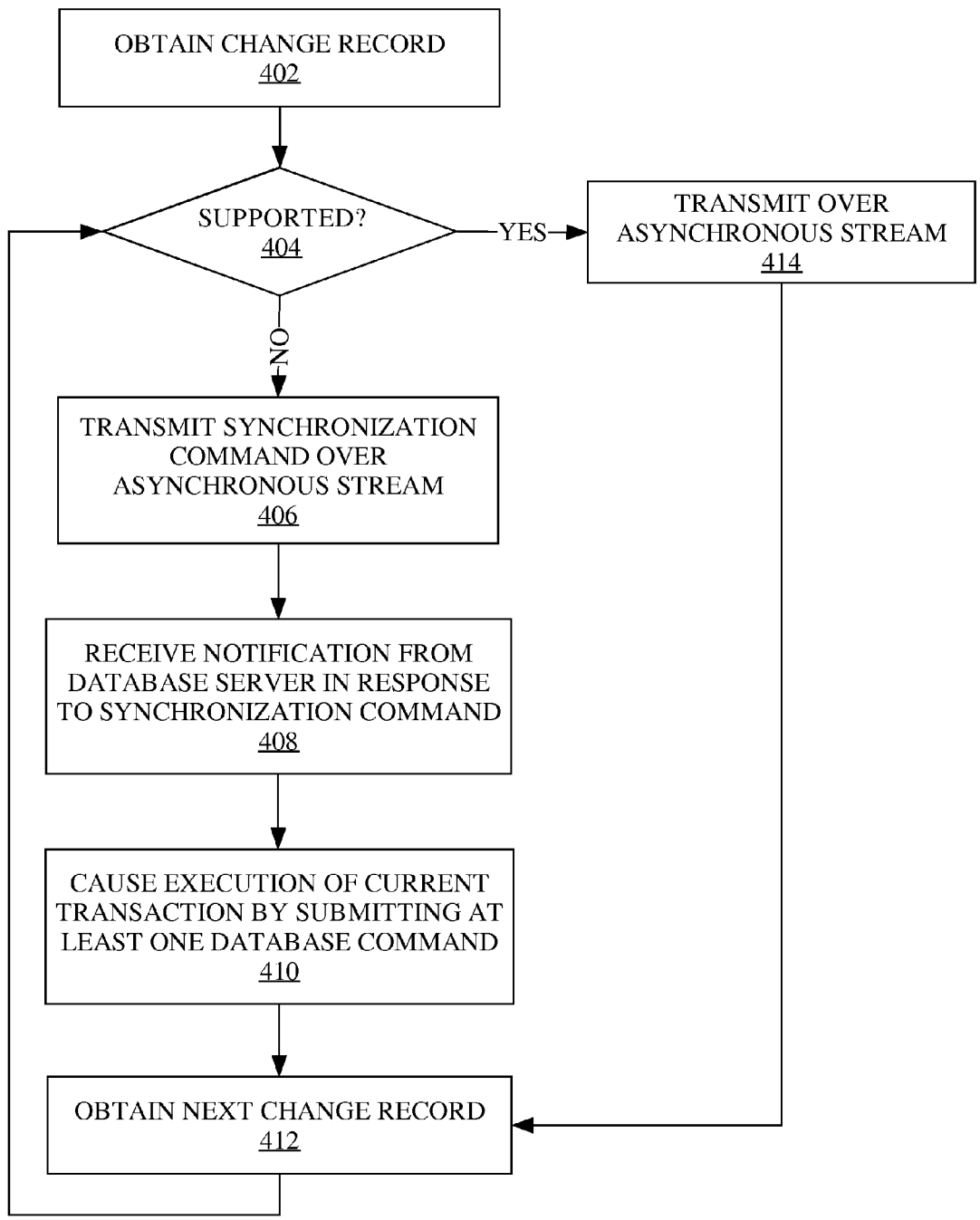
FIG. 4 is a flowchart illustrating an embodiment of a method for processing change records.

FIG. 4 is a flowchart illustrating an embodiment of a method for processing change records. Such a method may be performed by one or more computing devices. For example, one or more steps of the method may be performed by computer system 700. In one embodiment, the method is performed by a replication client coupled with a target database server, such as replication client 220.

In block 402, a change record is obtained. For example, the change record may be obtained from a file, a network location, or over a data stream.

In decision block 404, it is determined if the change record is supported. If it is determined that the change record is supported, processing proceeds to block 414. In one embodiment, change records corresponding to DMLs are supported in asynchronous mode, while change records corresponding to DDLs are not supported in asynchronous mode. In one embodiment, determining if the change record is supported is based on whether a data type associated with the change record is a supported data type.

In block 414, the change record is transmitted over an asynchronous stream. In one embodiment, the change record is transmitted over the asynchronous stream to a target database server, such as target database server 200, which is configured to asynchronously batch and/or reorder one or more transactions.

In decision block 404, if it is determined if the change record is not supported, processing proceeds to block 406. Decision block 404 is the point at which an integrated replication client determines whether to continue in a synchronized state or an asynchronous state with respect to a target database server.

In block 406, a synchronization command is transmitted over an asynchronous stream. In one embodiment, the target database server is configured to handle the synchronization command by bringing the target database server to a synchronized state. For example, the synchronized state may correspond to a state of the target database after a specific transaction has been committed. The specific transaction may be a transaction prior to the current transaction containing the unsupported change record.

In block 408, a notification is received from the target database server in response to the synchronization command. In one embodiment, the synchronization command indicates that the database server target database server has been brought to a synchronized state with the replication client. The synchronized state may correspond to a state of the target database after a specific transaction has been committed. The specific transaction may be a transaction prior to the current transaction containing the unsupported change record. In one embodiment, the target database server may finish executing one or more transactions and/or roll back one or more transactions to bring the target database server to a synchronized state. For example, if an error occurs while executing a reordered transaction, all operations of the reordered transaction that have been performed may be rolled back, bringing the target database system to a synchronized state where none of the transactions contained within the batch of operations has been executed.

In block 410, execution of the current transaction is caused by submitting at least one database command to the database server. The at least one database command may be submitted via a public interface of the target database server. In one embodiment, the at least one database command is submitted to execute the current transaction.

In block 412, the next change record is obtained. In one embodiment, the next record obtained will be the next record occurring after the current transaction executed by the replication client. This step marks the completion of the synchronized state between the target database server and the replication client. Processing continues to decision block 404.

8. Integrated Transaction Execution

Figure 5:
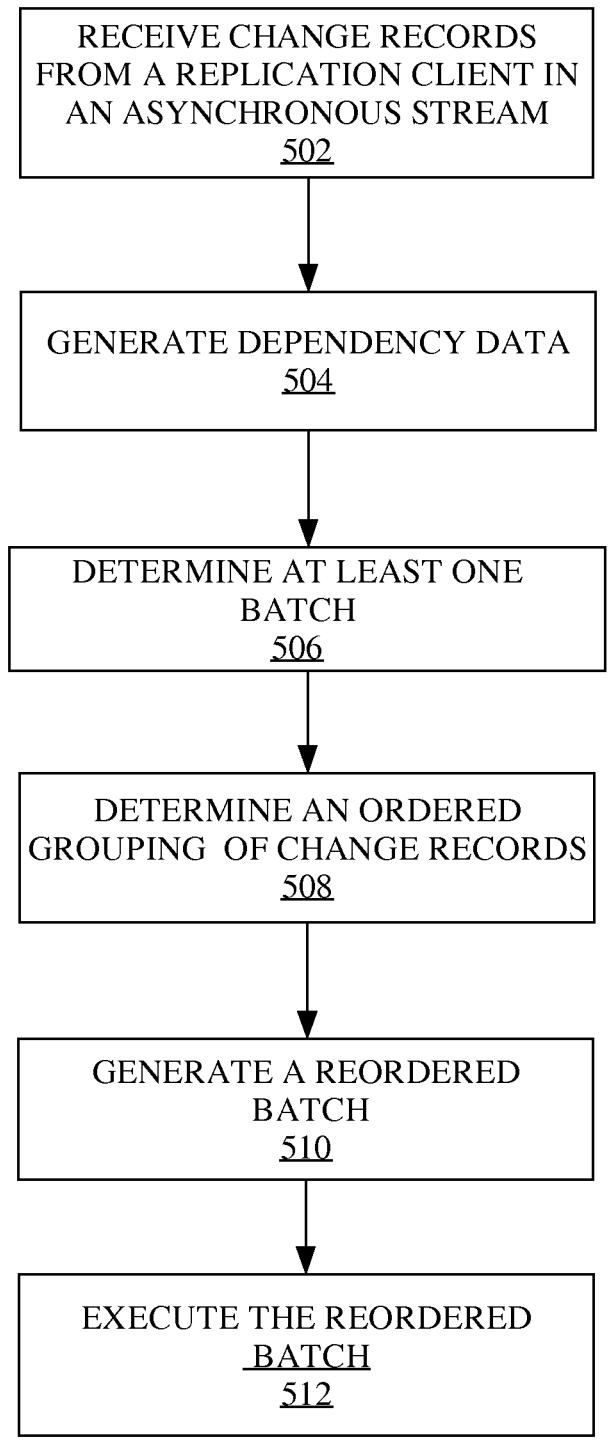
FIG. 5 is a flowchart illustrating an embodiment of a method for directly processing change records received from a replication client.

A database server configured in accordance with client and server integration for replicating data may be configured to: (a) directly process change records received from a replication client, and (b) execute one or more commands received from the replication client via a public interface. FIG. 5 is a flowchart illustrating an embodiment of a method for directly processing change records received from a replication client. Such a method may be performed by one or more computing devices. For example, one or more steps of the method may be performed by computer system 700. In one embodiment, the method is performed by a target database server, such as target database server 200.

In block 502, change records are received from a replication client over an asynchronous stream. In one embodiment, an apply reader 204 of the target database server receives the change record over an asynchronous stream 202 from replication client 220.

In block 504, dependency data is generated. In one embodiment, an apply reader 204 of the target database server 200 generates dependency data, such as to compute inter-transaction dependencies. In one embodiment, the dependency data may be used to compute intra-transaction dependencies, such as by one or more apply processes 208-210 of the target database server 200.

In block 506, at least one batch is determined. In one embodiment, an apply coordinator 206 of the target database server 200 is configured to determine at least one batch 212-214 comprising change records for at least one transaction.

In block 508, an ordered grouping of change records is determined for a batch. In one embodiment, one or more apply processes 208-210 is configured to determine the ordered grouping of change records, such as ordered grouping 324. The order grouping may be based on an operation type of each change record and the dependency data. In one embodiment, change records sharing operation types are grouped together unless a division based on the dependency data is determined.

In block 510, a reordered batch is generated. The reordered batch 326 may include a plurality of reordered operations. In one embodiment, one or more apply processes 208-210 is configured to generate the reordered batch.

In block 512, the reordered batch is executed. In one embodiment, one or more apply processes 208-210 of database server 200 is configured to execute the reordered batch. Database 200 may use one or more array operations on consecutive operations within the reordered batch 326.

If the reordered batch is executed successfully, the reordered batch may be committed in the target database.

9. Asynchronous Event Handling

FIG. 4 illustrates a method for synchronizing an integrated replication client and target database server, such as when an error occurs. Some error routines do not require bringing the target database server into a synchronized state with the replication client. For example, the error may be logged in a log file for one or more types of errors. Other types of event handling may be managed asynchronously. In asynchronous event handling, the target database server logs information regarding an event without notifying the replication client. It is up to the replication client to initiate requests for such data.

In one embodiment, asynchronous event handling is implemented on an integrated replication client and target database server. The target database server is configured to generate, store and/or update event occurrence data and event detail data. Examples of event occurrence data include an event count, an event flag, or any other data indicating that an event has occurred. Event detail data may include any data regarding a particular event. Event occurrence data and/or event detail data may be stored by the target database server, such as in a log and/or in a database.

A replication client may obtain event occurrence data and/or event detail data from the target database server, such as by calling one or more functions, including functions in a public interface of the target database server. In one embodiment, the replication client queries the target database server for event occurrence data. For example, the replication client may periodically query the target database server for the event occurrence data. When the event occurrence data indicates that a new event detailed data is available (e.g. the database server has detected a new event and has stored the event details corresponding to the event), the replication client queries the target database server for the new event detail data.

Figure 6:
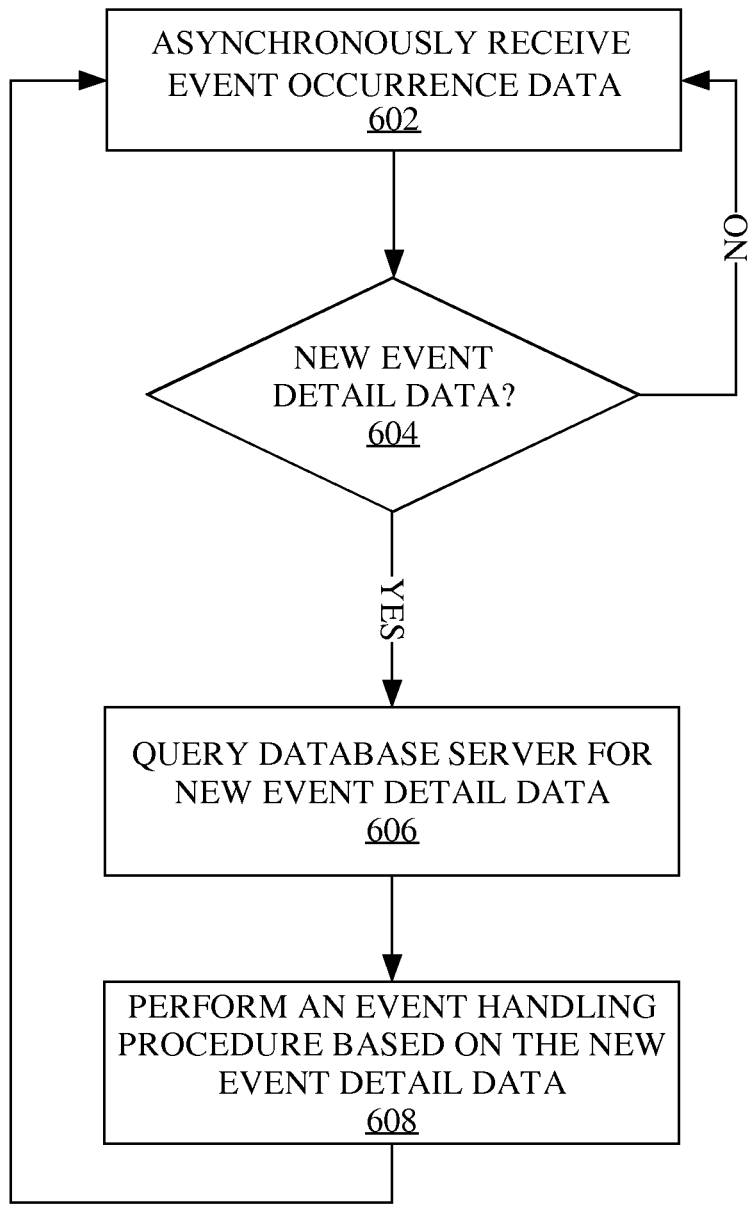
FIG. 6 is a flowchart illustrating an embodiment of a method for asynchronous event handling in an integrated system.

FIG. 6 is a flowchart illustrating an embodiment of a method for asynchronous event handling in an integrated system. Such a method may be performed by one or more computing devices. For example, one or more steps of the method may be performed by computer system 700. In one embodiment, the method is performed by a replication client, such as replication client 108.

In block 602, event occurrence data is received from the database server. In one embodiment, the event occurrence data is received asynchronously. For example, replication client 108 may asynchronously receive the event occurrence data from target database server 110. Alternatively or in addition, the target database server may be queried for event occurrence data. The event occurrence data may include such as an event count, a flag, or any other data indicating that an event has occurred. In one embodiment, replication client 108 periodically queries target database server 110 for the event occurrence data.

In decision block 604, it is determined if new event detail data exists. For example, replication client 108 may determine if an event count has been increased from a prior event count. Alternatively or in addition, asynchronously receiving event occurrence data may automatically trigger one or more operations, since the receipt of the event occurrence data may indicate that new event detail data exists. If it is determined that no new event detail data exists, processing proceeds to block 602.

In decision block 604, if it is determined that new event detail data exists, processing proceeds to block 606. Otherwise, processing returns to block 602.

In block 606, the database server is queried for new event detailed data when it is determined that new event detail data exists. In one embodiment, a replication client, such as replication client 108, queries the target database server for the new event detail data.

In block 608, an event handling procedure is performed based on the new event detailed data. The event handling procedure may be performed by a replication client, such as replication client 108. In one embodiment, the event handling procedure comprises writing data to an error queue based on the new event detail data.

10. Hardware Overview

Figure 7:
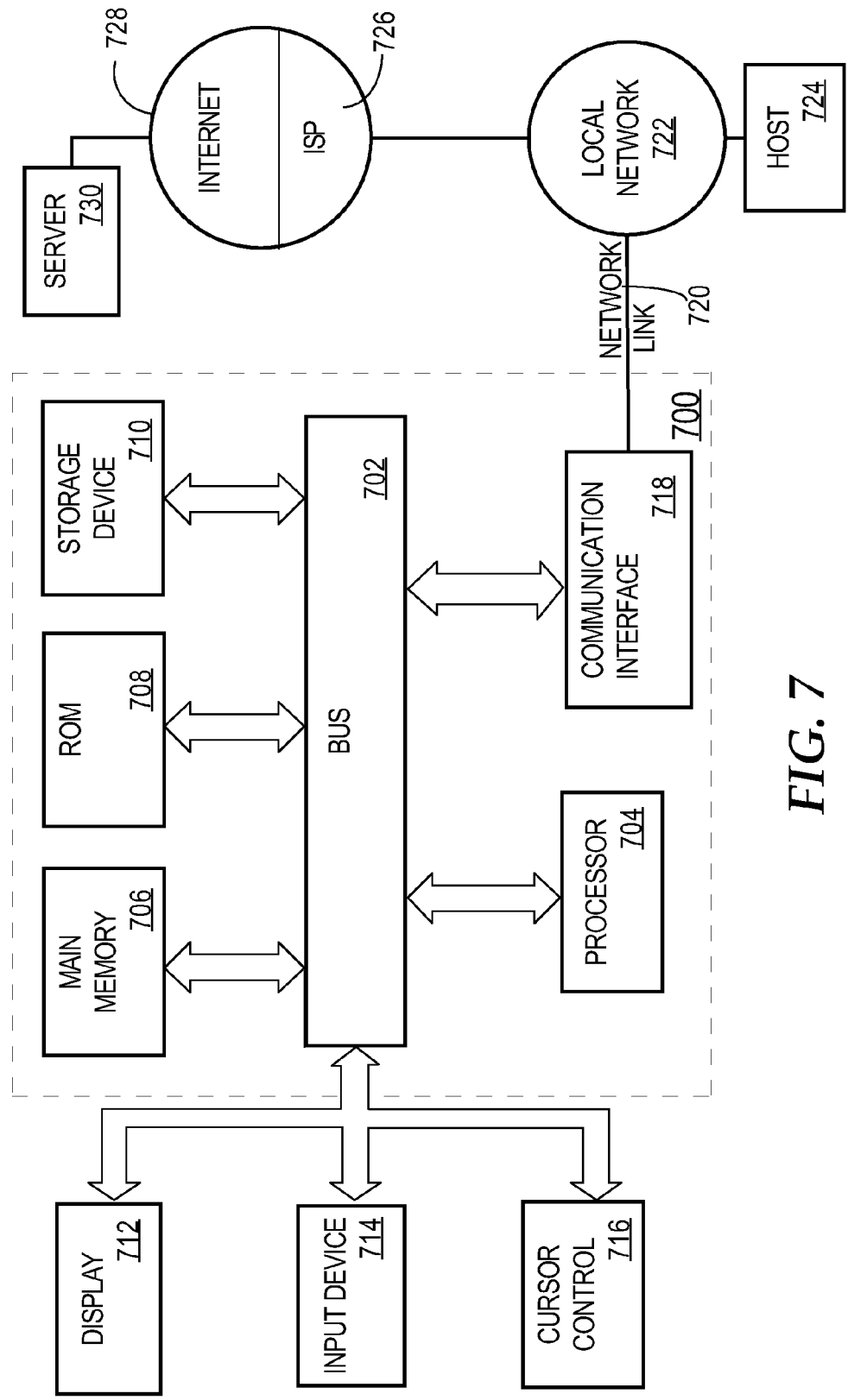
FIG. 7 illustrates a computer system upon which one or more embodiments may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

11. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, by a replication client, change records for transactions executed on a source database by a source database server;
   when replication between the replication client and a target database server is in asynchronous mode:
   transmitting, by the replication client, a first plurality of change records to a target database server for replication on a target database;
   replicating, by the target database server, one or more first transactions, described by one or more change records in the first plurality of change records, without acknowledgement to the replication client when the one or more first transactions are committed; and
   detecting a synchronization condition;
   in response to detecting the synchronization condition, switching from asynchronous mode to synchronized mode by bringing the target database to a synchronized state corresponding to a state of the target database after a particular transaction has been committed;
   in synchronized mode:
   submitting, by the replication client, one or more database commands comprising one or more second transactions described by a second plurality of change records to the target database server; and
   executing, by the target database server, the one or more database commands with acknowledgement to the replication client when the one or more second transactions are committed;
   after acknowledgement of committing the one or more second transactions is received by the replication client, resuming replication in asynchronous mode;
   wherein the method is performed by one or more computing devices.

2. The method of claim 1, further comprising:
   determining, by the target database server, at least one batch, each batch of the at least one batch comprising change records received from the replication client;
   for a particular batch selected from the at least one batch, the target database server:
   generating dependency data for at least one change record in the particular batch based on at least one constraint identifier for at least one column associated with the at least one change record;
   determining an ordered grouping of the change records of the particular batch based on an operation type of each change record of the particular batch and the dependency data, wherein change records of the particular batch that share operation types are grouped together unless a division based on the dependency data is determined;
   generating a reordered transaction comprising a plurality of reordered operations based on the ordered grouping of the change records of the particular batch;
   executing the reordered transaction;
   wherein the dependency data for the at least one change record comprises at least one hash value, wherein each selected hash value of the at least one hash value is generated by hashing a selected value of a selected change record with a selected constraint identifier of a selected column associated with the selected value;
   wherein the division based on the dependency data is determined when at least one hash value is shared.

3. The method of claim 1, wherein the target database server comprises a plurality of apply processes, the method further comprising:
   assigning, by the target database server, the one or more first transactions to the plurality of apply processes;
   wherein each particular apply process of the plurality of apply processes is configured to asynchronously apply and commit the transactions of the one or more first transactions without acknowledgement to the replication client;
   wherein the plurality of apply processes is configured to process the one or more first transactions in parallel.

4. The method of claim 1:
   wherein detecting the synchronization condition comprises detecting, by the replication client, one or more change records, corresponding to the one or more second transactions, for which asynchronous replication is not supported;
   wherein bringing the target database to a synchronized state comprises transmitting, by the replication client, a synchronization command to the target database server;
   wherein executing, by the target database server, the one or more database commands is performed after receiving the synchronization command.

5. The method of claim 1, further comprising:
   detecting, by the target database server, that an unhandled event has occurred;
   determining that the unhandled event is an asynchronous event that is manageable without synchronizing the replication client and the target database server;
   storing, by the target database server, unhandled event data, wherein the unhandled event data comprises event occurrence data and event detail data.

6. The method of claim 5, further comprising:
   periodically querying, by the replication client, the target database server for new event occurrence data in the unhandled event data;
   when new event occurrence data is detected indicating one or more new unhandled events, the replication client:
   querying the target database server for new event detail data corresponding to the new unhandled events;
   performing an event handling procedure based on the new event detail data.

7. The method of claim 6, wherein the event handling procedure comprises changing a read position of the replication client, wherein the read position corresponds to a position in the plurality of change records.

8. One or more non-transitory computer-readable media storing one or more sequences of instructions that, when executed by one or more processors, cause:
   receiving change records for transactions executed on a source database by a source database server;
   when replication with a target database server is in asynchronous mode:
   transmitting a first plurality of change records to a target database server for replication on a target database;
   wherein one or more first transactions, described by one or more change records in the first plurality of change records, are replicated by the target database server without acknowledgement when the one or more first transactions are committed; and
   detecting a synchronization condition;
   in response to detecting the synchronization condition, switching from asynchronous to synchronized mode by transmitting a synchronization command to the target database server, wherein the synchronization command causes the target database server to bring the target database to a synchronized state corresponding to a state of the target database after a particular transaction has been committed;

in synchronized mode, submitting one or more database commands comprising one or more second transactions to the target database server, wherein the one or more database commands cause the target database server to execute the one or more database commands, wherein executing the one or more database commands comprises the target database server committing the one or more second transactions with acknowledgement of the commit;

receiving acknowledgement of committing the one or more second transactions;

after receiving acknowledgement of committing the one or more second transactions, resuming replication in asynchronous mode.

9. The one or more computer-readable media of claim 8, wherein the one or more sequences of instructions include instructions that, when executed by the one or more processors, cause:

periodically querying the target database server for new event occurrence data in unhandled event data maintained by the target database server, wherein the target database server maintains the unhandled event data asynchronously without notification for at least one event type;

when new event occurrence data is detected indicating one or more new unhandled events, querying the target database server for new event detail data corresponding to the new unhandled events;

performing an event handling procedure based on the new event detail data.

10. The one or more computer-readable media of claim 9, wherein the event handling procedure comprises changing a read position that corresponds to a position in the plurality of change records for transmitting.

11. One or more non-transitory computer-readable media storing one or more sequences of instructions that, when executed by one or more processors, cause:

receiving, change records from a replication client for transactions executed on a source database by a source database server;

replicating the transactions on a target database;

when replication with the replication client is in asynchronous mode:
 replicating one or more first transactions, described by a first plurality of change records received from the replication client, without acknowledgement to the replication client when the one or more first transactions are committed;
 receiving a synchronization command from the replication client;
 in response to receiving the synchronization command, switching to synchronized mode by bringing the target database to a synchronized state corresponding to a state of the target database after a particular transaction has been committed;
 notifying the replication client that the target database is in a synchronized state;
 in synchronized mode:
  receiving, from the replication client, one or more database commands comprising one or more second transactions;
  executing the one or more database commands;
  transmitting an acknowledgement to the replication client indicating that the one or more second transactions were committed;
  resuming replication with the replication client in asynchronous mode.

12. The one or more computer-readable media of claim 11, wherein the one or more sequences of instructions include instructions that, when executed by the one or more processors, cause:

determining at least one batch, each batch of the at least one batch comprising change records received from the replication client;

for a particular batch selected from the at least one batch:
 generating dependency data for at least one change record in the particular batch based on at least one constraint identifier for at least one column associated with the at least one change record;
 determining an ordered grouping of the change records of the particular batch based on an operation type of each change record of the particular batch and the dependency data, wherein change records of the particular batch that share operation types are grouped together unless a division based on the dependency data is determined;
 generating a reordered transaction comprising a plurality of reordered operations based on the ordered grouping of the change records of the particular batch;
 executing the reordered transaction;

wherein the dependency data for the at least one change record comprises at least one hash value, wherein each selected hash value of the at least one hash value is generated by hashing a selected value of a selected change record with a selected constraint identifier of a selected column associated with the selected value;

wherein the division based on the dependency data is determined when at least one hash value is shared.

13. The one or more computer-readable media of claim 11, wherein the one or more sequences of instructions include instructions that cause:

assigning the one or more first transactions to a plurality of apply processes;

wherein each particular apply process of the plurality of apply processes is configured to asynchronously apply and commit the transactions of the one or more first transactions without acknowledgement to the replication client;

wherein the plurality of apply processes is configured to process the one or more first transactions in parallel.

14. The one or more computer-readable media of claim 11, wherein bringing the target database to a synchronized state corresponding to a state of the target database after a particular transaction has been committed comprises, after receiving the synchronization command, completing execution of transactions of the one or more first transactions up to the particular transaction;

transmitting a notification to the replication client that the target database is in the synchronized state.

15. The one or more computer-readable media of claim 11, wherein the one or more sequences of instructions include instructions that, when executed by the one or more processors, cause:

detecting that an unhandled event has occurred;

storing unhandled event data corresponding to the unhandled event, wherein the unhandled event data comprises event occurrence data and event detail data.

16. An apparatus comprising:
a network interface that is coupled to a data network for receiving one or more packet flows therefrom;
at least one processor;
one or more stored sequences of instructions which, when executed by the at least one processor, cause the at least one processor to perform:
receiving, over an asynchronous stream, a plurality of change records from a replication client over a stream of change records for a plurality of transactions executed on a source database by a source database server;
replicating the plurality of transactions on a target database;
when replication with the replication client is in asynchronous mode, asynchronously replicating one or more first transactions, described by change records in the plurality of change records, without acknowledgement when transactions of the one or more first transactions are committed;
receiving a synchronization command from the replication client when replication is in asynchronous mode;
in response to receiving the synchronization command, switching to synchronized mode by bringing the target database to a synchronized state corresponding to a state of the target database after a particular transaction has been committed;
notifying the replication client that the target database is in a synchronized state;
in synchronized mode, receiving, from the replication client, one or more database commands comprising one or more second transactions;
executing the one or more database commands, wherein executing the one or more database commands comprises committing the one or more second transactions;
transmitting an acknowledgement to the replication client indicating that the one or more second transactions were committed;
resuming replication with the replication client in asynchronous node.

17. The method of claim 1, further comprising:
after detecting the synchronization condition, pausing, by the replication client, transmission of the plurality of change records;
wherein resuming replication after acknowledgement is received by the replication client comprises the replication client resuming transmission of the plurality of change records.

18. The method of claim 4, wherein the change record for which asynchronous replication is not supported describes a schema change.

19. The method of claim 1, wherein detecting the synchronization condition comprises detecting, by the target database server, that an synchronized event has occurred that requires synchronization of the target database server and the replication client of the source database server before handling the synchronized event.

20. The one or more computer-readable media of claim 8:
wherein detecting the synchronization condition comprises detecting one or more change records, corresponding to one the or more second transactions, for which asynchronous replication is not supported;
wherein executing, by the target database server, the one or more database commands is performed after receiving the synchronization command over an asynchronous stream.

21. The one or more computer-readable media of claim 20, wherein the synchronization command is transmitted to the target database server over the asynchronous stream.

22. The one or more computer-readable media of claim 8, wherein the one or more sequences of instructions include instructions that, when executed by the one or more processors, cause:
after detecting the synchronization condition, pausing transmission of the plurality of change records;
wherein resuming replication after acknowledgement is received comprises resuming transmission of the plurality of change records.

* * * * *

UNITED STATES PATENT AND TRADEMARK OFFICE
CERTIFICATE OF CORRECTION

PATENT NO. : 9,589,041 B2  
APPLICATION NO. : 13/951281  
DATED : March 7, 2017  
INVENTOR(S) : Tran et al.

Page 1 of 1

It is certified that error appears in the above-identified patent and that said Letters Patent is hereby corrected as shown below:

In Column 6, Line 44, delete "an/or" and insert -- and/or --, therefor.

In Column 22, Line 22, in Claim 20, delete "one the" and insert -- the one --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*